United States Patent Office 3,422,248
Patented Jan. 14, 1969

3,422,248
HYDRONIC-ELECTRIC HEATING SYSTEMS
Adrian A. Beaulieu, West Bridgewater, James L. McKenney, Norwell, James W. Megley, Milton, and Lawrence M. Munroe, Dover, Mass., assignors to Beaulieu-Munroe Corporation, Boston, Mass., a corporation of Massachusetts
Filed Oct. 19, 1965, Ser. No. 497,961
U.S. Cl. 219—281          12 Claims
Int. Cl. H05b 1/00; 3/00; 7/18; 11/00; F24h 1/00

ABSTRACT OF THE DISCLOSURE

Apparatus for heating a structure and supplying process hot water by the use of electrical energy comprising a storage tank for accumulating and storing energy in the form of high temperature liquid and means for heating liquid in the tank electrically. The process hot water apparatus comprises a pilot coil, a primary coil and means for selectively utilizing the pilot coil singularly and in combination with the primary coil. The structure heating apparatus comprises a coil and means for controlling the introduction of system water thereto.

---

This invention relates to apparatus for heating a building or other structure and for providing hot water for the use of its occupants or hot water for a commercial process. The invention is applicable to commercial buildings as well as dwelling houses. The discussion to follow will be specifically directed to the heating of a dwelling house and the provision of domestic hot water therefor in order to facilitate a facile discussion of this invention. It being clearly understood that the invention is equally applicable to structures utilized for other purposes. The invention more particularly relates to apparatus for utilizing electrical energy for household heating and the supply of domestic hot water wherein energy is accumulated and stored during periods of low demand for electricity and subsequently used during periods of high demand.

Heretofore, the cost of heating a dwelling house electrically has been disproportionate to the cost of heating the same house by the other available energy sources. That is, although installation charges for the equipment required to heat a house electrically are comparable to or less than the installation cost of other heating means, the unit charges incurred for electrical energy to operate the equipment have been considerably in excess of the cost of other fuels. This, to a certain extent, is equally true of apparatus employed to provide domestic hot water. As a consequence, the number of dwelling houses which are electrically heated is relatively small despite other advantages such as safety and cleanliness.

This invention provides apparatus which markedly reduces the cost of electrically heating a house and supplying domestic hot water thereto by providing means which permit the purchase of electrical energy during periods that are known as off-peak periods and the storage of this energy for use during periods at which the demand for electrical energy is high, i.e. peak periods. Electrical utilities experience periods during the day in which the demand for electricity is substantially above the requirements at other times. In order satisfactorily to fulfill their obligation to the communities which they serve, the utilities are required to predicate their power supply capacity on the highest demand for electrical energy that can be expected at any given time during the day. For example, in the metropolitan Boston area it has been found that the period of maximum demand (peak period) is 5 p.m. to 10 p.m. Accordingly, the utility servicing this area must be capable of generating sufficient electrical energy to satisfy the demand during this peak period. However, this means that the utility must operate at less than full capacity for a substantial portion of each twenty-four hour period. That is, in the Boston area, the utility will utilize only a fraction of its energy producing capacity in the off-peak period from 10 p.m. to 5 p.m. Thus, during off-peak periods, excess energy is available. Accordingly, most major utilities have established unit charges for electricity which are lower in the off-peak period than in the period of high demand in order to encourage additional use during this period e.g. in the Boston area the peak rate is 1.7¢/kilowatt-hour and the off-peak rate is approximately 1¢/kilowatt-hour. Thus, applicants, by the provision of novel means for the accumulation and storage of energy during off-peak hours for later use, provides means for reducing the cost of electric heat and domestic hot water.

The utilization of the excess energy available during the off-peak hours is not a novel concept. Indeed, skilled artisans in the field have grappled with the problem for many years in the hope of spurring the use of electricity. However, these artisans have been confronted with a myriad of pitfalls which have prevented them from providing a solution to the problem. The primary pitfall has been in the provision of apparatus which can utilize accumulated energy in the form of high temperature stored water to heat circulating water at relatively low pressure to a temperature substantially below the stored water temperature by some economical means while minimizing the amount of circulating water that flashes into steam. Heretofore, the efforts of the skilled artisans laboring in this field have been primarily directed to the provision of a large storage tank capable of storing sufficient water at normal operating levels to satisfy foreseeable demands which occur during peak periods. However, it has been found that the storage tank must be so large as to preclude wide spread use due to the space which must be devoted to it.

Common practice in the use of domestic hot water heaters which operate electrically is to shut off the supply of electricity during the peak hours. This is normally accomplished by a timer in the heater. In this way, the heater can be operated at off-peak rates. However, no provision is made for the storage of excess energy for use during the peak hours. That is, domestic hot water is normally approximately 120° F. to 140° F. and presently available electrical hot water heaters are designed to heat water therein to this specific temperature. Accordingly, when a number of draws or demands are made on the heater during the peak hours, the available hot water is rapidly dissipated. The cold water fed into the heater thereafter is not heated as the supply of electrical energy is shut off during the peak period. As a result, the presently available conventionally sized electrical hot water heaters can supply but a relatively small amount of hot water during the peak hours. For example, if a housewife were to run a washer or other appliances of this type for a relatively short period during the peak hours, the supply of hot water would be exhausted. The size tank required to fulfill the total anticipated usage would render the use of electrical hot water heaters which stored hot water at the operating level economically prohibitive. Thus, presently available electrical hot water heaters permit the purchase of electricity at off-peak rates but do not provide an adequate supply of hot water for the peak hours.

Accordingly, it is an object of this invention to provide apparatus for heating a structure electrically by accumulating energy and storing it in the form of high temperature water during off-peak periods and utilizing the stored energy to heat the structure during both the peak and off-peak periods. Suitable substitutes for water may be employed without departing from the scope of the invention.

It is another object of this invention to provide apparatus for satisfying the demand for process hot water at relatively low cost by purchasing electrical energy during the off-peak period and storing it in the form of high temperature water and employing it to heat process water during both the peak and off-peak periods.

It is a further and more specific object of this invention to provide an equalizing chamber for use in the apparatus associated with the provision of domestic hot water whereby any steam generated therein may be condensed and temperatures equalized in the system during a fast draw.

It is a still further object of this invention to provide a novel condensing chamber for use with the apparatus particularly associated with the heating system whereby any steam generated in the system may be conveniently condensed.

To this end and in accordance with a feature of this invention there is provided apparatus for heating a building and supplying domestic hot water therefor by the use of electrical energy comprising a storage tank for accumulating and storing energy in the form of high temperature liquid, a pilot hot water coil immersed in said tank sized to ensure sufficient exposure of system water passing therethrough to said tank liquid during the normal range of rates of flow to elevate the temperature thereof to a prescribed level when the tank temperature is a maximum without elevating the temperature of the system water above its flash point, a primary hot water coil of larger size than said pilot coil immersed in said tank, means appurtenant to said hot water coils for selectively utilizing said pilot coil singularly when system water passing therethrough is elevated to a prescribed temperature level and in combination with said primary coil when system water passing through said pilot coil is not elevated to a prescribed temperature level comprising a mixing valve responsive to the temperature level of system water flowing thereto to adjust the amount of system water flowing thereto from the primary coil, said primary coil being isolated by said appurtenant means when the pilot coil is being used singularly, an equalizing chamber for condensing steam formed in said pilot coil from residual system water remaining in the pilot coil during an inoperative period when the system water stands stagnant in the pilot coil, a heating coil immersed in said tank, a flow chamber from which heating system water is directed to said heating coil or to a supply line, a condensing chamber comprising a heat reserve chamber through which return heating system water is passed to said flow chamber, a condensing tube through which heating system water is passed to the supply line upon egress from the heating coil, and a spray tube having a plurality of apertures therein extending upwardly into said condensing chamber and through which return heating system water is passed from the heat reserve chamber to temper heated system water and condense steam therein, and means for controlling the flow of heating system water from the flow chamber and condensing tube to the supply line in response to the temperature level of the heating system water whereby to control the passage of heating system water through the heating coil.

The above and other features of the invention including various and novel details of construction and combination of parts will now be more particularly described with reference to the accompanying drawings and pointed out in the claims. The principles and features of this invention may be employed in varied and numerous embodiments without departing from the scope of the invention.

Figure 1:
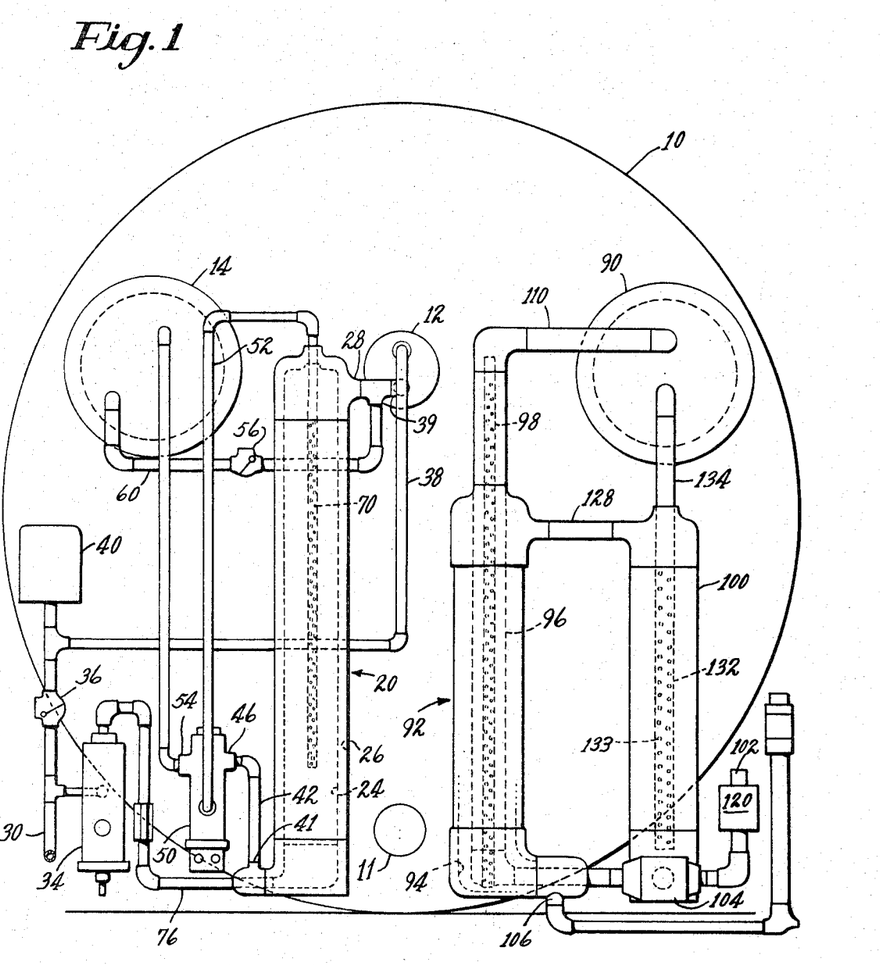
FIG. 1 is a front elevation of apparatus embodying this invention.
Figure 2:
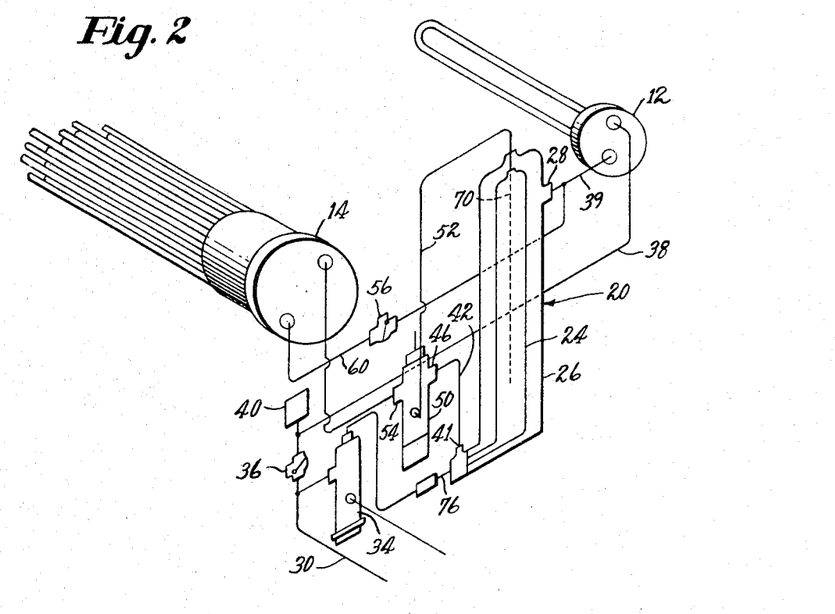
FIG. 2 is a schematic illustration of that portion of the apparatus shown in FIG. 1 which is used to produce domestic hot water.

The system illustrated in FIG. 1 is intended for use in heating a dwelling house and supplying hot water therefor. It can be modified for use in commercial buildings by the completion of certain minor alterations which are not important for an understanding of the invention. It can also be employed to heat a variety of commercial or manufacturing structures and/or to supply hot water for commercial processes. The specific temperature and pressure levels delineated hereinafter are those applicable in the preferred embodiment of the invention except where the context otherwise admits. The specific parameters may be altered to accommodate specific operating conditions.

Electrical energy is utilized to heat water in a storage tank 10 by means of a conventional emersion electric heater 11 (FIG. 1) located therein. A coil capacity of twenty kilowatts has been found adequate for the normal residence in a northern section of the United States, e.g. Boston. The water within the storage tank 10 is heated to a maximum of 280° F. in the preferred embodiment of the apparatus. This condition would apply during the winter months when the residence must be heated and domestic hot water provided. The storage tank 10 is closed and, therefore, there is no problem of vaporization at this temperature level. The pressure within the tank 10 varies between 30 p.s.i.g. and 60 p.s.i.g. depending on the temperature level therein.

A temperature of 200 F. is normally adequate fulfill the heating requirements and demand for domestic hot water during the summer months. Accordingly, conventional means for reducing the electrical energy intake are provided (not shown) to permit the use of the system at a 200° F. operating level during the summer period. A switch (not shown) may be provided to accomplish this end.

Domestic hot water is normally supplied to a mixing valve, as hereinafter discussed, at a temperature between 150° F. to 200° F. which in turn supplies water for domestice use at 140° F. The standard hot water heating system uses water at approximately the 110° to 200° F. level depending on the type of radiation used to supply heat. The fundamental problem resolved by this invention is the utilization of the heat stored in the tank 10 at the 280° F. (winter) or 200° F. (summar) levels to heat water to the 150° F. to 200° F. (domestic hot water) and 110° F. to 200° F. (heating system) levels.

Water is normally supplied to a household at approximately 20 to 50 p.s.i.g. Hot water heating systems generally operate at approximately the 25 p.s.i.g. level but not more than 30 p.s.i.g. for safety reasons as well as equipment cost. Water at a temperature of 280° F. must be maintained at approximately 35 p.s.i.g. or it will flash into steam. Accordingly, in order to utilize the energy stored in the 280° F. water to heat a household by a hot water heating system and supply domestic hot water therefor (hereinafter referred to collectively as system water), means must be provided which precisely control the exposure of the system water to the 280° F. tank. That is, only that amount of heat can be transferred to the system water which will elevate it to a temperature level below its flash point but to a minimum temperature of 150° F. or 160° F. If the period of exposure is too extended, the system water will be elevated to a temperature which will cause it to flash into steam, e.g. for 25 p.s.i.g. this would be 267° F. The problem is further complicated by the fact that the 280° F. level only exists in the tank 10 during the off-peak hours and for a variable period immediately thereafter depending on the demand therefor. That is, electrical energy is purchased only during the off-peak hours. Accordingly, any heat transferred from the tank 10 during the peak hours results in a loss of heat which will not be replaced until the return of the off-peak power input. Thus, the temperature level of the tank 10 will decline during the peak period. Means must therefore be provided which control the period of exposure of the system water to be heated to an interval correlated to the exact temperature level in the tank 10 at any given time.

The discussion will now be directed specifically to that portion of the apparatus associated with the provision of domestic hot water (referred to as the system water). It is to be understood that the apparatus to be described is equally capable of supply hot water for use in a commercial process or the like. Accordingly, the term process hot water will hereinafter be used to define either domestic hot water or hot water for a commercial process.

DOMESTIC HOT WATER

The domestic hot water apparatus essentially comprises a pilot coil 12 and a main coil 14 which are immersed in the tank 10 and means appurtenant thereto for selectively utilizing the main coil 14 as required by the temperature level in the tank 10. The pilot coil 12 is employed exclusively when the tank 10 is at the 280° F. level. When the temperature in the tank drops to a level where the pilot coil 12 is unable to supply system water at the 150° F. level, the main coil 14 is activated as hereinafter described. The pilot coil 12 will heat the system water to within a temperature range of 150° F. when the tank 10 is at the 280° F. level. The exact temperature within this range is determined by the rate of flow of system water through the system, i.e., by the amount the associated hot water faucet is opened.

The coil 12 is sized such that system water passing therethrough will be exposed to the 280° F. temperature in the tank 10 for a period sufficient to raise the temperature level thereof to within the 150° F. to 200° F. range regardless of the size of the draw. That is, the coil 12, in the preferred embodiment illustrated in the drawings, has only one tube pass. The length and diameter of the tube are determined by calculating the exposure period required to elevate "tap" water to a minimum temperature of 150° F. when it is exposed to the 280° F. tank water during a maximum draw. These dimensions must also be such as not to permit the system water to be elevated above the flash point during a minimum draw. The exposure period is governed by the rate of flow of the system water through the tube which is in turn predicated on the pressure level of the system water and the tube size. Thus, the tube size required can be calculated accurately once certain basic data is available. Undesirable flashing of the system water into steam can therefore be avoided when the coil 12 is in use by proper sizing thereof. That is, the range of the rate of the flow of system water drawn into the system when a demand for hot water is made is controlled such that the system water will be heated to between 150° F. and 200° F. and, thus, not allowed to flash into steam. When a minimum demand for hot water is made, the temperature of the system water will be elevated to the 200° F. level as the rate of flow is at a minimum. When a maximum demand is made, the system water will be heated to approximately the 150° F. level as a high rate of flow will prevail.

When a demand for hot water is stopped, a certain amount of system water will remain in the tube of the coil 12. That is, during a period in which the hot water faucet is open, system water will flow steadily through the system at a rate adequate to elevate the temperature thereof to a minimum temperature of 150° F. However, when the faucet is closed, the fluid pressure sustaining the flow of system water is eliminated. Flow of system water will, thus, stop with the result that a residue of system water will remain isolated in each of the elements of the system. The residue of system water in the coil 12 will be exposed to the temperature of the tank 10. If the temperature in the tank 10 is in the vicinity of the off-peak temperature of 280° F., the residue of system water will be heated to this temperature and, accordingly, will flash into steam. That is, assuming a subsequent draw is not immediately made. However, the volume of water which flashes into steam is relatively small and, therefore, flashing can be permitted without adverse effects on the system. That is, when flashing occurs, corrosive minerals are produced which are harmful to the system and, further, noise results. The flashing which occurs in the residual system water in the coil 12 is of such a small magnitude as to produce miniscule mineral deposits and no noise. It is to be noted for consideration in the later discussion relative to the coil 14 that if the system water in the coil 14 were allowed to flash into steam substantial mineral deposits would be produced as well as a noise of high volume as a result of the size of the coil 14.

When a demand for hot water is made subsequent to the flashing of residual system water into steam in the coil 12, the steam in the coil 12 enters a temperature equalizing chamber 20 wherein it is condensed into water. That is, when a subsequent demand is made for hot water, system water enters the system under pressure and forces the steam out of the coil 12 and into the equalizing chamber 20 where it is condensed into water thereby preventing its introduction to or passage through the entire system as steam. The equalizing chamber 20 comprises concentric inner and outer chambers 24 and 26, respectively. Steam produced during a nonoperative period in the coil 12 enters the outer chamber 26 of the equalizing chamber 20 at the upper portion thereof through the piping port 28. The steam entering the outer chamber 26 will be condensed by the volume of residual water remaining in the inner chamber 24 as a legacy of the previous draw and also by contact with the inner surface of the chamber 24. The residual system water in the inner chamber 24 is not exposed to the heating effects of the tank 10 during a nonoperative period and therefore will be at a temperature between 150° F. and 200° F. As the steam enters the chamber 26 it is exposed to the cooling effects discussed above and is condensed into water and drops to the bottom of the chamber 26. The steam is thus condensed in the equalizing chamber 20 without producing any noise.

In the operation of the system during the off-peak hours when the temperature in the tank 10 is in the 280° F. range, cold water is admitted to the system through an inlet 30 when a demand for hot water is made. A controlled, variable amount of incoming cold water is admitted to a mixing valve 34 for mixing with hot system water supplied from the equalizing chamber 20 at a temperature within the 150° F. to 200° F. range, as hereinafter described. The exact amount of incoming cold water admitted to the mixing valve 34 is automatically controlled by the mixing valve in response to the temperature level of the hot system water supplied to it. That is, the mixing valve admits sufficient cold water to temper the hot system water supplied at 150° F. to 200° F. to supply hot water at the tap within a range of 120° F. to 140° F. The mixing valve 34 is a standard commercially available valve.

The remainder of the incoming system water passes through a one-way or check valve 36, into the piping line 38, and thereafter into the coil 12 where it is exposed to the 280° F. water in the tank 10 and heated to 150° F. to 200° F. depending upon the draw. An expansion tank 40 is provided to accommodate expansion which takes place as a result of the heating of the system water. The check valve 36 prevents the hot system water in coil 12 and piping 38 from backing up into the cold water supply. If the check 36 were not present, hot system water would back up and be introduced into the mixing valve 34 at the cold inlet thereby resulting in the supply of untempered water at the hot water tap.

The incoming system water forces the steam formed by the residual system water in the coil 12 through the piping 39 into the chamber 26 where it is condensed and falls into the bottom of the chamber 26 as hot water. Thereafter, system water is fed through the coil 12, heated to 150° F. to 200° F. and then passed into the chamber 26 as hot system water. System water passes from the lower portion of the chamber 26 through an outlet 41 into piping 42 which leads to a port 46 in a mixing valve 50. The mixing valve 50 functions to mix system water supplied from the coils 12 and 14. The mixing valve 50 is inoperative until the water flowing from the chamber 26 drops below the 150° F. level. That is, as long as the coil 12 supplies water to the mixing valve 50 at 150° F. or greater, the mixing valve 50 will isolate the coil 14 and, thus, not function as a mixing valve. This situation will prevail during the off-peak hours when the temperature in the tank 10 is at the 280° F. level. It will also prevail for a variable interval during the peak period. That is, the coil 12 will supply water between 150 to 200° F. when the temperature of the water in the tank 10 is in the 240° to 280° F. range. Accordingly, the mixing valve 50 will not normally be activated during the peak period until the temperature of the water in the tank 10 drops below the 240° F. level. This is determined by the amount of usage during the initial portion of the peak period and by the rate of flow for a particulate draw during the period of declination. The mixing valve 50 is a standard commercially available valve.

Accordingly, in operation of the system during the off-peak period, and a variable portion of the peak period system water enter the mixing valve 50 and passes directly therethrough into piping 52. That is, the valve seat associated with the port 54 of the mixing valve 50 is seated whereby to prevent passage of system water from the coil 14 to the mixing valve 50. A one-way or check valve 56 in the line 60 leading from a point in the line 39 adjacent the coil 12 to the coil 14 permits the flow of system water from coil 12 to coil 14 only. Thus, the portion of the system associated with the coil 14 is a closed system when the port 54 of the mixing valve 50 is closed. Ergo, when the port 54 is closed and the temperature in the tank 10 is in the 280° F. range, pressure is built up to the 35 to 60 p.s.i.g. level within the above defined closed portion of the system. That is, since the system is closed, a pressure build up is possible within the system correlated to the temperature in the tank 10 whereby to prevent the residual system water in the closed portion of the system from flashing into steam. This build up in pressure in front of the one-way valve 56 prevents the valve 56 from being opened by the system water which is being fed through the system at approximately 25 p.s.i.g. Thus, when the port 54 is closed, no system water flows in or out of the closed portion of the system associated with the coil 14.

Figures 4, 5:
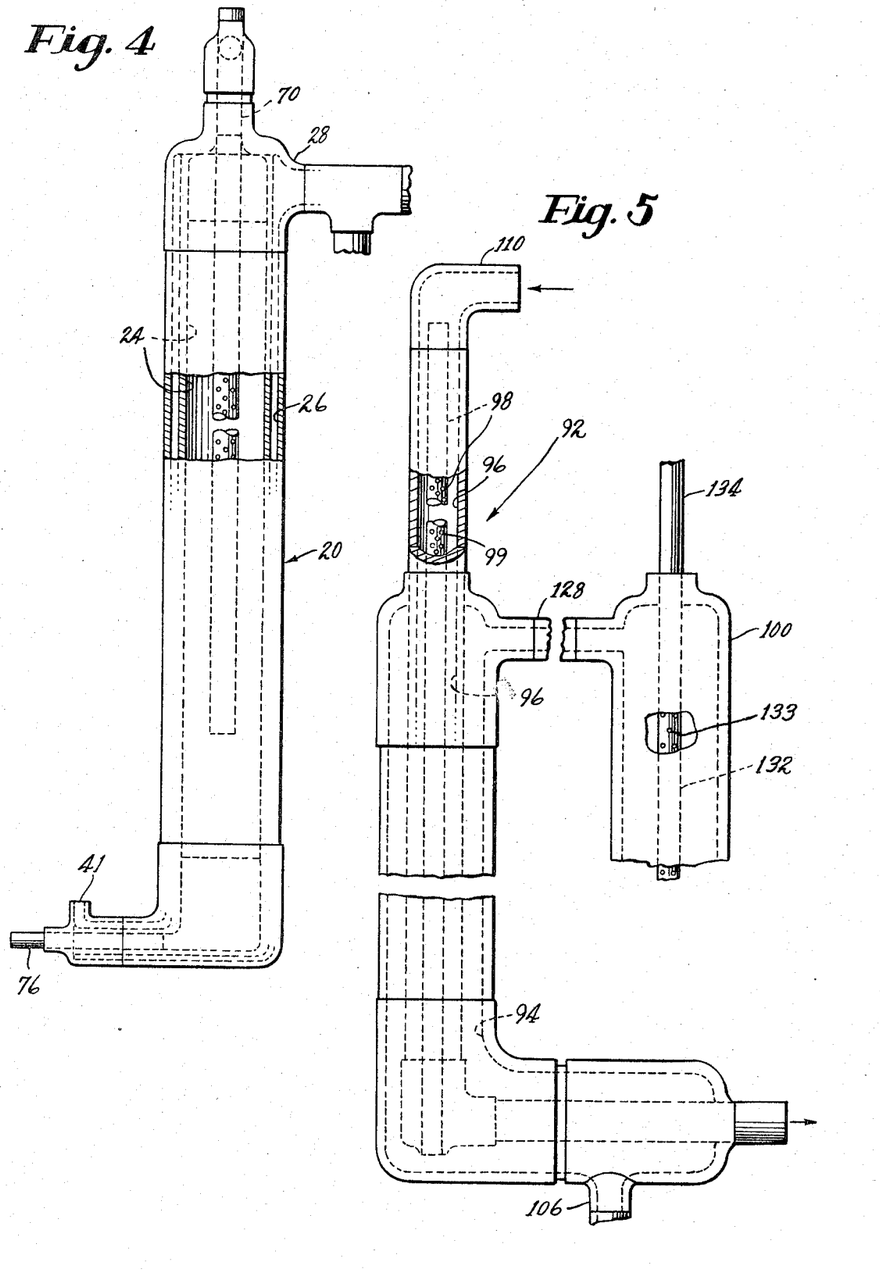
FIG. 4 is a side view of an equalizing chamber embodying certain features of this invention.
FIG. 5 is a side view of a condensing chamber and flow chamber embodying certain features of this invention.

The system water thereafter flows through the piping 52 into a tube 70 in the upper end of the inner chamber 24 of the equalizing chamber 20, see particularly FIG. 4. The tube 70 extends downwardly from the top of the chamber 24 into the chamber and has a plurality of openings randomly formed therein. A portion of the system water passing through the tube 70 is forced through the openings and is sprayed onto the dividing member common to the inner and outer chambers 24 and 26, respectively. The dividing member is thus tempered to ensure the condensation of any steam emanating from the coil 12 which enters the chamber 26. The spray also functions to condense any steam that might have been leaked into the chamber 26 during a period of no demand. Likewise, steam leaked into the mixing valve 50 through the closed port 54 due to wear of the valve seat will be condensed when it is forced out through the holes. The equalizing chamber also serves to speed the response of the system to a draw as a result of the residue of heated water therein. This is particularly important when a fast draw is made.

The system water falls to the lower portion of the chamber 24 from the tube 70 and passes therefrom through the piping 76 to the mixing valve 34 wherein it is mixed with a predetermined, measured flow of incoming water to supply process hot water at a desired temperature level.

As noted above, during the peak hours when the source of electric energy for heating the water in the tank 10 is shut off, the temperature of the water in the tank 10 gradually will be lowered as a result of demands thereon both for the supply of hot water and for heat. When the temperature in the tank 10 has been lowered to a point where it can no longer heat the system water passing through the coil 12 to the 150° F. level (approximately at 240° F.), the port 54 of the mixing valve 50 will be automatically opened slightly to permit limited flow of hot water from the coil 14 into the mixing valve 50. The system associated with the coil 14 is, thus, no longer closed. Accordingly, since the pressure built up therein has been lowered in response to the temperature drop and vented into the mixing valve 50, a portion of the system water flowing through the line 39 enters the line 60, passes through the check valve 56 and is exposed to the coil 14. However, the temperature in the tank 10 has been lowered and, thus, the system water will not flash into steam as it traverses the coil 14. This is likewise true of the residual system water in the closed system associated with the coil 14. That is, at the time the mixing valve is opened, the temperature of this residual water has been lowered to a point where it will not flash into steam as a result of the decline in temperature of the tank 10 water.

The mixing valve 50 determines the amount of system water flowing through the coil 14 by automatically adjusting the position of the valve seat associated with the port 54. That is, the mixing valve 50 automatically adjusts the amount of system water flowing through the port 54 in response to the temperature of the system water supplied through the piping 42 from the coil 12. The valve seat associated with the flow of system water through the port 46 is simultaneously closed in proportion to the degree which the port 54 is opened. The amount of system water flowing through the coil 14 is controlled in this way. If and when the lowest level of required stored heat is reached, the port 54 would be fully opened and the port 46 completely closed. In this case, system water would flow from the coil 12 directly to the coil 14 through the line 60 and then to the mixing valve 50. That is, the coils are used in series at the low level of tank 10 temperature. However, this condition would not normally be reached as the system is designated to supply the normal needs for heating capacity during the peak period and a safety factor added thereto.

The flow of system water through the coil 14 is accomplished in the same manner as through the coil 12 except that more tubes are involved. That is, the tube surface area is greater and, therefore, the period of exposure of the system water is longer. Thus, the coil 14 has the capacity to transfer more heat to the system water at a given temperature level. Note also that the temperature level of the water entering the coil 14 is higher as it has already been exposed to the coil 12.

System water passing from the mixing valve 50 through the piping 52 passes through the same system members when the coils 12 and 14 are used in tandem as when the coil 12 is alone sufficient.

Thus, apparatus is provided for storing electrical energy in the form of water at high temperature during off-peak hours and utilizing the stored energy during the peak periods.

When the tank 10 is adjusted for summer usage, the coils 12 and 14 will normally be used in tandem.

The discussion will now be directed to a discussion of that portion of the apparatus particularly associated with heating the household. It is to be understood that use of the invention to heat a household is described to facilitate a delineation of the invention and is not intended as a limitation thereof; the invention being applicable to the heating of any structure.

Heating System

The heating apparatus essentially comprises a heating coil 90 immersed in the tank 10 and a condensing chamber 92. The rate of flow within the process hot water system described above generally varies between 5 and 8 gallons per minute. Accordingly, as discussed above, the coil 12 must be used during the off-peak hours when the temperature of the tank 10 is in the 280° F. range in order to prevent continuous flashing of the system water into steam. That is, for a rate of flow of 5 gallons, the system water would be elevated above its flash point if it were exposed to the 280° F. tank 10 temperature for the period required to pass through the coil 14. The rate of flow of system water through the standard household hot water heating system is between 10 and 20 gallons per minute. Thus, the size of the coil 90 may be greater than that of the coil 12. In fact, the size of the coil 90 is approximately that of the coil 14.

The condensing chamber 92, see particularly FIG. 5, comprises a heat reserve chamber 94, a condensing tube 96, and a spray tube 98. The condensing chamber 92 serves as a conduit through which return system water is passed for introduction to a flow chamber 100 thereafter to be directed either to the coil 90 or back into the supply line 102 through a three-way valve 104, as hereinafter described with greater specificity. Return system water enters the condensing chamber 92 through a piping port 106 and passes directly into the heat reserve chamber 94. Heated system water which has passed through the coil 90 enters the condensing chamber 92 through piping 110 which feeds the hot system water into the upper end of the condensing tube 96. The heated system water coming from the coil 90 passes through the condensing tube 96 and out through the three-way valve 104 to the supply line 102 when the valve 104 is set to permit such passage, as hereinafter described in detail. During a part of the cycle of operation of the system illustrated in FIG. 3 and described hereinafter, a portion of the return system water entering the chamber 94 is forced up into the spray tube 98. The spray tube 98 extends upwardly into the condensing tube 96 and comprises a cylindrical tube having a closed upper end and a plurality of apertures 99 formed in the sides thereof. Accordingly, return system water forced into the spray tube 98 is sprayed outwardly into the condensing tube 96 to be commingled with the heated system water flowing from the coil 90. The primary function of the spray is to condense any steam formed in the coil 90 during a period of non-operation and to temper system water flowing through the condensing tube 96, as hereinafter described.

Figure 3:
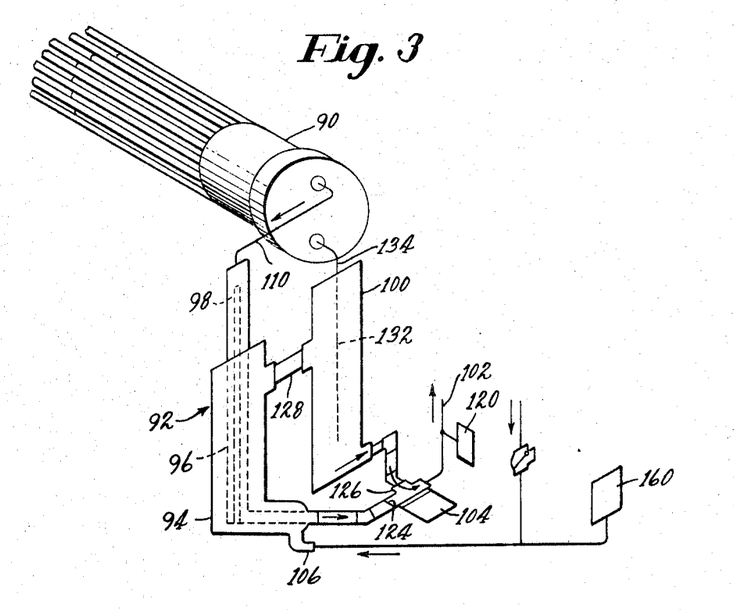
FIG. 3 is a schematic illustration of that portion of the apparatus shown in FIG. 1 which is used to produce domestic hot water.

An appreciation of the structure and cooperation of the combination of members included in the system illustrated in FIGS. 3 and 5 is most readily conveyed by a detailed discussion of the operation thereof. Accordingly, the remainder of the structural elements included in FIG. 3 not noted above will now be described in conjunction with a detailed delineation of the operation of the system. It is to be initially and clearly understood that a household heating system is distinguished from a domestic hot water system in that the former is a closed system. That is, whereas the domestic hot water system supplies water for consumption and continually is supplied with new system water, a household heating system recirculates the same system water without having any source of replenishment. Accordingly, the apparatus illustrated in FIG. 3 together with the piping used to convey the hot system water through the house comprises a closed system. The significance of this will be advanced in the discussion to follow.

In order to facilitate an orderly presentation, the discussion will begin at a point in the operative cycle where a demand for heat just has been made. A demand is initiated by a standard thermostat (not shown) which may be located at any convenient location in the house and set for any desired temperature level in the house. The thermostat actuates an aquastat 120 which controls the temperature of the system water within a prescribed range. For example, if the thermostat were set for 70° F., the aquastat would be actuated by the thermostat when the temperature in the house dropped below 70° F. The actuated aquastat would react to effect heating of the system water if the temperature of the system water was below 150° F., for example. Once actuated, however, the aquastat would remain actuated until the temperature of the system water was elevated to the 170° F. level in this particular example. The prescribed range for the aquastat in this example is, thus, 150° F. to 170° F. The reason for this is that 150° F. system water can maintain the temperature of a house at the desired 70° F. level or elevate the temperature to this level within a given acceptable number of recirculations through the system. System water at 170° F. can elevate the temperature to 70° F. faster but not significantly so. However, the aquastat is designed to continue in operation until the temperature of the system water is raised to 170° F. once it is actuated to minimize the number of times the coil 90 is utilized to maintain a given temperature level. The specific temperature levels used and the temperature range for the aquastat are suggested by way of example to facilitate discussion of the apparatus and are not intended to limit the scope of the invention. The exact temperature levels required for a particular household depend on the type heating system, heat loss factors, etc. Demand for heat by the thermostat (not shown) also actuates circulators (not shown) which initiate the circulation of system water within the system.

When the temperature of the system water is unable to satisfy the demand for heat registered on the thermostat; e.g., when the temperature of the system water is below 150° F. in the above example, the aquastat actuates the three-way valve 104 to open the piping port 124 and close the piping port 126 FIG. 3. Thus, the valve 104 permits the flow of system water from the condensing tube 96 to the supply line 102 but not from the flow chamber 100 to the supply line 102.

Return system water entering the heat reserve chamber 94 passes therefrom through piping 128 into the flow chamber 100. When the valve 104 is seated at the port 126, as discussed above, system water is forced into a bleed tube 132 which directs the system water through piping 134 to the coil 90. The bleed tube 132 is an elongated tube having a plurality of apertures 133 therein which depends downwardly into the flow chamber 100 from the upper portion thereof. The lower end of the bleed tube 132 is open. System water entering the flow chamber 100 when the piping port 126 is closed, enters the bleed tube 132 through the above described apertures 133 and through the lower, open end thereof for passage into the coil 90.

The initial flow of system water into the coil 90 after a period of non-operation forces steam formed in the coil 90, as hereinafter described in detail, into the line 110 leading to the condensing tube 96. When the steam enters the condensing tube 96, it is exposed to the spray of return water emanating from the spray tube 98, as discussed above. The steam is thus condensed without producing audible noise and flows to the base of the condensing tube 96 and into the supply line 102 through the valve 104. The system water entering the coil 90 is elevated in temperature and thereafter passes into the condensing tube 96 wherein the spray of return water from the tube 98 is mixed therewith. The system water within the closed system is thus gradually elevated to the level required by the aquastat. That is, the heated water passing from the coil 90 is tempered by the portion of the return water which is introduced to it through the spray tube 98. If the system water were not tempered in the condensing tube, the aquastat would be prematurely actuated before all the system water was within or close to the prescribed level. The temperature of return water passing through the heat reserve chamber 94 is elevated by heat transferred thereto from the heated system water within the condensing tube 96. This transfer of heat also functions to ensure a progressive, gradual elevation of the temperature of the system water. Recirculation of system water through the heat reserve chamber 94, flow chamber 100, coil 90, condensing tube 96 into the supply line 102 continues in the manner described above until the temperature setting on the aquastat is satisfied.

When the upper level of the temperature range set on the aquastat is reached; e.g. 170° F. in the above example, the aquastat actuates the three-way valve 104 to close the piping port 124 and open the piping port 126. The valve 104 will thereafter permit the flow of system water to the supply line 102 from the flow chamber 100 but not from the condensing tube 96. As a result, flow of system water from the coil 90 to the condensing tube 96 will cease due to the build up of pressure behind the piping port 124 of the valve 104. Residual system water will thus stand stagnant in the condensing tube 96 and coil 90. The residual system water in the coil 90 continuously will be exposed to the temperature within the tank 10 and, accordingly, will be elevated in temperature to a level corresponding to the temperature within the tank 10 if the interval of no demand for heat is succiently prolonged. If the temperature within the tank 10 is above the flash point temperature of the system water, certain of the system water within the coil 90 will flash into steam. That is, the residual system water in the coil 90 nearest the outlet piping 110 will reach the flash point first as it will have been exposed to the temperature in the tank 10 for the longest period. The flashing of this system water into steam produces a build-up in pressure which is transmitted to the residual system water entrapped in the condensing tube 96. Since the condensing tube 96 is closed by the valve 104 there is no vent for the pressure build-up except into the chamber 100. The expansion of the system water when it flashes into steam and the corresponding build-up in pressure will force a portion of the residual system water initially entrapped in the coil 90 out of the coil through the bleed tube 132 before it flashes into steam. Thus, the total volume of system water entrapped in the coil 90 will not flash into steam. The pressure buildup within the coil 90 will be transmitted to the remainder of the system and compensated for in an expansion tank 160. Any leakage of steam from the coil 90 into the bleed tube 132 prior to the equation of pressure in the system will be condensed as it sprays out through the apertures in the sides thereof. Once the pressure in the system appurtenant to the coil 90 reaches the pressure in the coil 90, there will be no further leakage of steam. Further, the pressure within the condensing tube 96 will prevent the passage of water thereto through the spray tube 98. The total pressure increase in approximately 5 p.s.i.g.

Noise will be produced when the residual system water in the coil 90 flashes into steam. However, the volume will be insignificant as a result of the phenomena just described. Corrosive minerals will also be deposited when flashing occurs. However, since the system is closed, the amount of minerals deposited will decrease with each flashing until all of the minerals suspended in the system water are removed. Thereafter, there will be no further depositing of minerals at flashing. That is, since no water is added to the system, once all the minerals are removed the problem is eliminated. The actual amount of mineral deposits is so small as to be of no significance.

As noted above, when the temperature requirement of the aquastat is satisfied, the valve 104 will thereafter permit system water to flow to the supply line 102 from the flow chamber 100 but not from the condensing tube 96.

The satisfaction of the temperature requirement of the aquastat does not necessarily mean that the house has been elevated to the desired temperature level, i.e., that the thermostat has been satisfied. If the aquastat has been satisfied but not the thermostat, the circulator will continue to circulate the system water. However, the return water entering the heat reserve chamber 94 will pass to the flow chamber 100 and thereafter through the piping port 126 to the supply line 102. The circulating system water is prevented from entering the coil 90 and condensing tube 96 as a result of the build-up in pressure behind the piping port 124. The system water will be circulated in the manner just described until sufficient heat has been transferred from the circulating system water to the house to satisfy the temperature requirement registered on the thermostat. When the thermostat is satisfied, the circulators will be stopped and the system water will remain stagnant in the system.

The above discussion is based on the assumption that the temperature level of the system water was below the temperature range required by the aquastat when the demand for heat was made by the thermostat, e.g., below 150° F. in the above example. When the temperature of the system water is within the range required by the aquastat, the valve 104 will not be actuated by a demand for heat, i.e., if the system water is above 150° F. in the example. The valve 104 will remain seated in the port 124 where it was located at the end of the previous demand for heat. Thus, when the circulator is actuated, system water will flow into the heat reserve chamber 94, through the flow chamber 100 and into the port 126 to the supply line 102. The system water will be circulated in this manner until the thermostat is satisfied or until the temperature of the system water is lowered below the minimum temperature required by the aquastat as a result of the transfer of heat to the house. When the temperature is lowered below the said minimum, the aquastat will actuate the valve 104 in the manner described above whereby the system water will be directed through the coil 90, as discussed above.

Having thus described our invention, what we claim as new and desire to secure by Letters Patent of the United States is:

1. Apparatus for heating a structure and supplying process hot water by the use of electrical energy comprising a storage tank for accumulating and storing energy in the form of high temperature liquid, electrical heating means for heating liquid in said tank, a pilot hot water coil immersed in said tank, a primary hot water coil immersed in said tank, means appurtenant to said coils for selectively utilizing said pilot coil singularly and in combination with said primary hot water coil to heat system water to a prescribed level without permitting the system water to flash into steam during a period of system water flow, a primary heating coil immersed in said tank for heating system water associated with a heating system and means associated with said primary heating coil for controlling the introduction of heating system water thereto whereby to regulate the amount of heat transferred to the heating system water.

2. Apparatus for supplying process hot water by the use of electrical energy comprising a storage tank for accumulating and storing energy in the form of high temperature liquid, electrical heating means for heating liquid in said tank, a pilot coil immersed in said tank, a primary coil immersed in said tank, means appurtenant to said coils for selectively utilizing said pilot coil singularly and in combination with said primary coil to heat system water to a prescribed level without permitting the system water to be elevated above its flash point temperature during a period of system water flow, and an equalizing chamber for condensing steam formed in said pilot coil from residual system water remaining in the pilot coil during an inoperative period when system water stands stagnant in the pilot coil.

3. Apparatus for supplying process hot water by the use of electrical energy comprising a storage tank for accumulating and storing energy in the form of high temperature liquid, electrical heating means for heating liquid in said tank, a pilot coil immersed in said tank, a primary coil immersed in said tank, means appurtenant to said coils for selectively utilizing said pilot coil singularly and in combination with said primary coil to heat system water to a prescribed level without permitting the system water to be elevated above its flash point temperature during a period of system water flow, and an equalizing chamber for condensing steam formed in said pilot coil from residual system water remaining in the pilot coil during an inoperative period when system water stands stagnant in the pilot coil comprising elongated, concentric inner and outer chambers, steam produced in said pilot coil being directed into said outer chamber to be condensed by contact with the surfaces thereof and by system water in said inner chamber.

4. Apparatus for supplying process hot water by the use of electrical energy comprising a storage tank for accumulating and storing energy in the form of high temperature liquid, electrical heating means for heating liquid in said tank, a pilot coil immersed in said tank, a primary coil immersed in said tank, and means appurtenant to said coils for selectively utilizing said pilot coil singularly and in combination with said primary coil to heat system water to a prescribed level without permitting the system water to be elevated above its flash point temperature during a period of system water flow, comprising a mixing valve responsive to the temperature level of system water flowing thereto from the pilot coil to adjust the amount of system water flowing thereto from the primary coil, said primary coil being isolated by said appurtenant means when the pilot coil is used singularly.

5. Apparatus for supplying process hot water by the use of electrical energy comprising a storage tank for accumulating and storing energy in the form of high temperature liquid, electrical heating means for heating liquid in said tank, a pilot coil immersed in said tank sized to ensure sufficient exposure of system water passing therethrough to said tank liquid during the normal range of rates of flow to elevate the temperature thereof to a prescribed level when the tank temperature is a maximum without elevating the temperature of the system water above its flash point, a primary coil immersed in said tank, means appurtenant to said coils for selectively utilizing said pilot coil singularly when system water passing therethrough is elevated to a prescribed temperature level and in combination with said primary coil when system water passing through said pilot coil is not elevated to a prescribed temperature level comprising a mixing valve responsive to the temperature level of system water flowing thereto from the pilot coil to adjust the amount of system water flowing thereto from the primary coil, and an equalizing chamber for condensing steam formed in said piloi coil from residual system water remaining in the pilot coil during an inoperative period when the system stands stagnant in the pilot coil.

6. Apparatus for supplying process hot water by the use of electrical energy comprising a storage tank for accumulating and storing energy in the form of high temperature liquid, electrical heating means for heating liquid in said tank, a pilot coil immersed in said tank sized to ensure sufficient exposure of system water passing therethrough to said tank liquid during the normal range of rates of flow to elevate the temperature thereof to a prescribed level when the tank temperature is a maximum without elevating the temperature of the system water above its flash point, a primary coil of larger size than said pilot coil immersed in said tank, piping joining said coils for use in series having a one-way valve therein to permit the flow of system water from the pilot coil to the primary coil, means appurtenant to said coils for selectively utilizing said pilot coil singularly when system water passing therethrough is elevated to a prescribed temperature level and in combination with said primary coil when system water passing through said pilot coil is not elevated to a prescribed temperature level comprising a mixing valve responsive to the temperature level of system water flowing thereto to adjust the amount of system water flowing thereto from the primary coil, said mixing valve cooperative with said one-way valve to isolate said primary coil when the pilot coil is being used singularly, and an equalizing chamber for condensing steam formed in said pilot coil from residual system water remaining in the pilot coil during an inoperative period when the system water stands stagnant in the pilot coil.

7. Apparatus for heating a structure by the use of electrical energy comprising a storage tank for accumulating and storing energy in the form of high temperature liquid, electrical heating means for heating liquid in said tank, a coil immersed in said tank, a condensing chamber comprising a heat reserve chamber, a condensing tube through which system water is passed to a supply line after passage through said coil, and a spray tube having a plurality of apertures therein extending upwardly into said condensing tube and through which return system water is passed from the heat reserve chamber to temper heated system water therein and condense steam therein and means for controlling the flow of system water to said coil to permit isolation of said coil whereby system water is passed from the heat reserve chamber to the supply line without passing through the coil.

8. Apparatus for heating a structure by the use of electrical energy comprising a storage tank for accumulating and storing energy in the form of high temperature liquid, electrical heating means for heating liquid in said tank, a coil immersed in said tank, a flow chamber from which system water is selectively directed to the coil and to the supply line, a condensing chamber comprising a heat reserve chamber through which return system water is passed to said flow chamber, a condensing tube through which system water is passed to supply line after passage through said coil, and a spray tube having a plurality of apertures therein extending upwardly into said condensing tube and through which return water is passed from said heat reserve chamber, said return system water being sprayed outwardly through said apertures in said condensing tube to temper heated system water passing therethrough and to condense any steam therein produced in said coil, and means for controlling the flow of system water from said flow chamber and from said condensing tube to the supply line in response to the temperature level of the system water whereby to control the passage of system water through the coil.

9. Apparatus for heating a structure by the use of electrical energy comprising a storage tank for accumulating and storing energy in the form of high temperature liquid, electrical heating means for heating liquid in said tank, a coil immersed in said tank, a flow chamber for selectively directing system water introduced thereto to the coil and to a supply line, said flow chamber comprising a bleed tube having a plurality of apertures therein depending downwardly from an upper end thereof, means linking said bleed tube and the coil whereby system water in said flow chamber may pass through said bleed tube into said coil and whereby steam formed in said coil is condensed when it is sprayed outwardly through said bleed tube apertures into the flow chamber, a condensing chamber comprising a heat reserve chamber through which return system water is passed to said flow chamber, a condensing tube through which system water is passed to the supply line upon egress from the coil, and a spray tube having a plurality of apertures therein extending upwardly into said condensing tube through which return system water is passed from the heat reserve chamber, said return system water being sprayed outwardly through said spray tube apertures into the condensing tube to temper heated system water passing therethrough and to condense any steam therein produced in said coil, and means for controlling the flow of system water from said flow chamber and from said condensing tube to the supply line in response to the temperature level of the system water whereby to control the passage of system water through the coil.

10. Apparatus for heating a structure and supplying process hot water by the use of electrical energy comprising a storage tank for accumulating and storing energy in the form of high temperature liquid, electrical heating means for heating liquid in said tank, a pilot hot water coil immersed in said tank sized to ensure sufficient exposure of system water passing therethrough to said tank liquid during the normal range of rates of flow to elevate the temperature thereof to a prescribed level when the tank temperature is a maximum without elevating the temperature of the system water above its flash point, a primary hot water coil of larger size than said pilot coil immersed in said tank, means appurtenant to said hot water coils for selectively utilizing said pilot coil singularly when system water passing therethrough is elevated to a prescribed temperature level and in combination with said primary coil when system water passing through said pilot coil is not elevated to a prescribed temperature level comprising a mixing valve responsive to the temperature level of system water flowing thereto to adjust the amount of system water flowing thereto from the primary coil, said primary coil being isolated by said appurtenant means when the pilot coil is being used singularly, an equalizing chamber for condensing steam formed in said pilot coil from residual system water remaining in the pilot coil during an inoperative period when the system water stands stagnant in the pilot coil, a heating coil immersed in said tank, a flow chamber from which heating system water is selectively directed to said heating coil and to a supply line, a condensing chamber comprising a heat reserve chamber through which return heating system water is passed to said flow chamber, a condensing tube through which heating system water is passed to the supply line upon egress from the heating coil, and a spray tube having a plurality of apertures therein extending upwardly into said condensing tube and through which return heating system water is passed from the heat reserve chamber to temper heated system water and condense steam therein, and means for controlling the flow of heating system water from the flow chamber and condensing tube to the supply line in response to the temperature level of the heating system water whereby to control the passage of heating system water through the heating coil.

11. Apparatus for supplying process hot water by the use of electrical energy comprising a storage tank for accumulating and storing energy in the form of high temperature liquid, electrical heating means for heating liquid in said tank, a coil immersed in said tank for heating system water to a prescribed level without permitting the system water to be elevated above its flash point temperature during a period of system water flow, and an equalizing chamber for condensing steam formed in said coil from residual system water remaining in said coil during an inoperative period when system water stands stagnant in said coil.

12. Apparatus according to claim 11 wherein said equalizing chamber comprising elongated inner and outer chambers, steam produced in said coil being directed into said outer chamber to be condensed by contact with the surfaces thereof and by system water in said inner chamber.

References Cited

UNITED STATES PATENTS

| | | | |
|---|---|---|---|
| 1,773,806 | 8/1930 | Bowen et al. | 219—315 |
| 2,036,816 | 4/1936 | Leader | 219—326 |
| 3,103,575 | 9/1963 | Pecci | 219—475 |
| 3,171,597 | 3/1965 | Baier | 237—19 |
| 3,341,122 | 9/1967 | Whittell | 237—19 |

RICHARD M. WOOD, *Primary Examiner.*

C. L. ALBRITTON, *Assistant Examiner.*

U.S. Cl. X.R.

219—316, 475; 237—19